(12) United States Patent
Yang et al.

(10) Patent No.: US 8,956,757 B2
(45) Date of Patent: Feb. 17, 2015

(54) TRANSPARENT ELECTROCHEMICAL ENERGY STORAGE DEVICES

(75) Inventors: Yuan Yang, Stanford, CA (US); Liangbing Hu, College Park, MD (US); Yi Cui, Stanford, CA (US); Sangmoo Jeong, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 142 days.

(21) Appl. No.: 13/551,749

(22) Filed: Jul. 18, 2012

(65) Prior Publication Data
US 2013/0022868 A1    Jan. 24, 2013

Related U.S. Application Data

(60) Provisional application No. 61/509,998, filed on Jul. 20, 2011.

(51) Int. Cl.
| | | |
|---|---|---|
| H01M 4/02 | (2006.01) | |
| H01M 10/00 | (2006.01) | |
| H01M 6/00 | (2006.01) | |
| H01M 6/40 | (2006.01) | |
| H01M 4/64 | (2006.01) | |
| H01M 4/70 | (2006.01) | |
| H01M 4/72 | (2006.01) | |
| H01M 4/13 | (2010.01) | |
| H01M 4/139 | (2010.01) | |
| H01M 10/0525 | (2010.01) | |

(52) U.S. Cl.
CPC *H01M 4/72* (2013.01); *H01M 4/13* (2013.01); *H01M 4/139* (2013.01); *H01M 10/0525* (2013.01); *H01M 2004/021* (2013.01); *Y02E 60/122* (2013.01)
USPC ............ 429/209; 429/127; 429/124; 429/233

(58) Field of Classification Search
None
See application file for complete search history.

(56) References Cited

U.S. PATENT DOCUMENTS

| | | | |
|---|---|---|---|
| 6,379,835 B1 | 4/2002 | Kucherovsky et al. | |
| 2005/0074671 A1* | 4/2005 | Sugiyama et al. | 429/231.95 |
| 2011/0001118 A1 | 1/2011 | Bhupendra et al. | |
| 2011/0070488 A1 | 3/2011 | West et al. | |
| 2011/0111296 A1 | 5/2011 | Berdichevsky et al. | |
| 2011/0165382 A1 | 7/2011 | Gogolides et al. | |

FOREIGN PATENT DOCUMENTS

| | | |
|---|---|---|
| JP | 2000-306611 A | 11/2000 |
| JP | 2006-261020 A | 9/2006 |
| WO | WO 02/43937 | 6/2002 |

(Continued)

OTHER PUBLICATIONS

Search Report from PCT/US2012/047233 dated Jan. 23, 2013.

(Continued)

*Primary Examiner* — Ula C. Ruddock
*Assistant Examiner* — Matthew Van Oudenaren
(74) *Attorney, Agent, or Firm* — Foley & Lardner LLP; Cliff Z. Liu

(57) ABSTRACT

A transparent electrochemical energy storage device includes a pair of electrodes and an electrolyte disposed between the electrodes. Each of the electrodes includes a substrate and a set of electrode materials that are arranged across the substrate in a pattern with a feature dimension no greater than 200 µm and occupying an areal fraction in the range of 5% to 70%.

20 Claims, 9 Drawing Sheets

(56) References Cited

FOREIGN PATENT DOCUMENTS

| WO | WO 2010/133735 | | 11/2010 |
|----|----|----|----|
| WO | WO 2011/003038 A2 | | 1/2011 |
| WO | WO2010133735 | * | 7/2011 |
| WO | WO 2011/003038 | | 9/2011 |

OTHER PUBLICATIONS

Ferreira et al. "Self-rechargeable paper thin-film batteries: performance and applications." J. Display Tech. 6:8 (Aug. 2010).

Granqvist et al. "Electrochromic device technology based on nanoporous nanocrystalline thin films on PET foil." (2008).

Suga et al. "Photocrosslinked nitroxide polymer cathode-active materials for application in an organic-based paper battery." Chem Comm. 1730-1732 (2007).

Trapa et al., "Rubbery graft copolymer electrolytes for solid-state, think-film lithium batteries." J. Electrochem. Soc. 152(1) (2005).

Yang et al. "Transparent lithium-ion batteries." ww.pnas.org (Jul. 25, 2011).

* cited by examiner

A

B

C

A

B

TRANSPARENT ELECTROCHEMICAL ENERGY STORAGE DEVICES

CROSS-REFERENCE TO RELATED APPLICATION

This application claims the benefit of U.S. Provisional Application Ser. No. 61/509,998 filed on Jul. 20, 2011, the disclosure of which is incorporated herein by reference in its entirety.

FIELD OF THE INVENTION

The invention generally relates to electrochemical energy storage devices and, more particularly, to transparent electrochemical energy storage devices.

BACKGROUND

Transparent electronics is an emerging and promising technology for the next generation of electronic and optoelectronic devices. Transparent devices have been fabricated for various applications, including transistors, optical circuits, displays, touch screens, and solar cells. However, the battery, a key component in portable electronic devices, has not been adequately demonstrated as a transparent device. Consequently, fully integrated and transparent devices cannot be adequately realized because the battery occupies a considerable footprint area and volume in these devices. Typically, a battery includes electrode materials, current collectors, electrolyte, separators, and packaging. None of these components are typically transparent except for the electrolyte. Furthermore, as these components are typically in series, all of these components should be clear to make the whole device transparent. A conventional approach for making transparent devices is to reduce the thickness of active materials to much less than their optical absorption length, as demonstrated in carbon nanotubes, graphene, and organic semiconductors. However, this approach is not suitable for batteries, because active battery materials typically do not have an absorption length long enough in the full voltage window. For example, $LiCoO_2$ and graphite, the most common cathode and anode in Li-ion batteries, are good absorbers even with a thickness less than 1 μm. Moreover, conductive carbon black additive is generally included in electrodes, which occupies at least 10% of the total volume. To power common portable electronic devices, the total thickness of electrode materials should be on the order of 100 μm-1 mm, much thicker than the absorption length of the electrode materials. This dilemma comes from the relationship that the transparency of materials typically decays exponentially with the thickness, whereas the amount of energy stored typically increases linearly with the thickness.

It is against this background that a need arose to develop the transparent electrochemical energy storage devices and related methods and systems described herein.

SUMMARY

Embodiments of the invention relate to transparent electrochemical energy storage devices, such as batteries and supercapacitors, and the incorporation of such transparent electrochemical energy storage devices in a variety of electronic and optoelectronic devices to render those devices transparent, including cell phones, tablet computers, portable media players, handheld game consoles, and other portable electronic devices.

As active materials are typically not transparent and have to be thick enough to store sufficient amounts of energy, the conventional approach of using thin films for transparent devices is not suitable. Some embodiments of the invention provide a grid-structured electrode to solve this dilemma, which can be fabricated by a microfluidics-assisted method. The grid-structured electrode can include a regular or irregular array of dots or strips, which can be curved or straight. The feature dimension in the electrode can be below the resolution limit of human eyes, and, thus, the electrode appears transparent. Moreover, by aligning multiple electrodes together, the amount of energy stored increases readily without sacrificing the transparency. In some embodiments, this results in a battery with energy density of at least about 10 Wh/L at a transparency of at least about 60%. The device also can be flexible, further broadening its potential applications. The transparent device configuration also allows in situ Raman study of fundamental electrochemical reactions in batteries.

One aspect of the invention relates to a transparent electrochemical energy storage device. In one embodiment, the device includes a pair of electrodes and an electrolyte disposed between the electrodes. Each of the electrodes includes a substrate and a set of electrode materials that are arranged across the substrate in a pattern with a feature dimension no greater than 200 μm and occupying an areal fraction in the range of 5% to 70%.

Another aspect of the invention relates to a patterned electrode. In one embodiment, the patterned electrode includes a substrate including an array of trenches, and a set of electrode materials disposed in the trenches. A thickness of the set of electrode materials is in the range of 5 μm to 500 μm, and a transparency of the patterned electrode is in the range of 30% to 90% for wavelengths in the range of 400 nm to 700 nm.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Definitions

Figure 1:
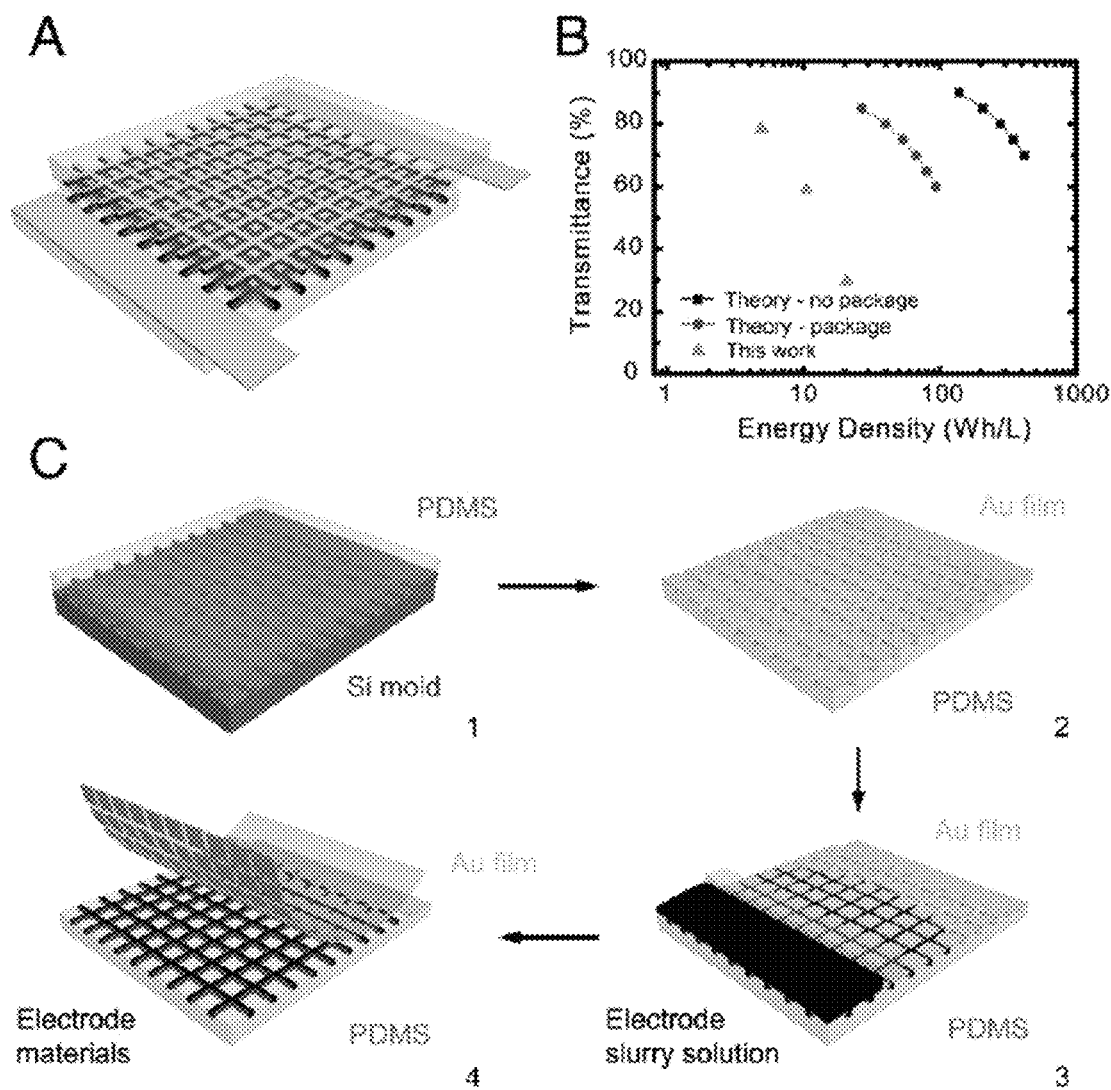
FIG. 1: (A) The schematic of a transparent battery with grid-like patterned electrodes. In contrast to using thin film electrodes, this concept allows scalable energy storage while maintaining high transparency. The battery includes a PDMS substrate, electrode active materials, and a metal current collector. (B) The transparency versus volumetric energy density: The squares account for active materials alone, and the circles consider the volume of other components, such as separators, current collectors, and packaging. (C) The process flow of fabricating a transparent battery: (1) Transfer grid patterns from a silicon mold to PDMS, (2) evaporate gold current collector onto the PDMS substrate, (3) fill in battery electrode materials by a microfluidics-assisted method, and (4) peel off gold film on top of the PDMS substrate.

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the term "nanometer range" or "nm range" refers to a range of dimensions from about 1 nm to about 1 μm. The nm range includes the "lower nm range," which refers to a range of dimensions from about 1 nm to about 10 nm, the "middle nm range," which refers to a range of dimensions from about 10 nm to about 100 nm, and the "upper nm range," which refers to a range of dimensions from about 100 nm to about 1 μm.

As used herein, the term "nano-sized" refers to an object that has at least one dimension in the nm range. A nano-sized object can have any of a wide variety of shapes, and can be formed of a wide variety of materials. Examples of nano-sized objects include nano-sized structures such as nanowires, nanotubes, and nanoparticles.

Transparent Electrochemical Energy Storage Devices

To overcome the challenges of implementing transparent devices, some embodiments of the invention provide a microfluidics-assisted method to fabricate a patterned grid-like battery electrode filled with nanomaterials and other electrode materials. The resulting battery appears transparent as the patterned electrode materials can cover a relatively small fraction of the whole area, and the pattern features are smaller than the detection limit of human eyes. Li-ion batteries with different transparencies can be fabricated. For example, a full cell with an energy density of at least about 10 Wh/L, including packaging, can be demonstrated at a transparency of at least about 60%. Furthermore, by aligning multiple transparent batteries in series, the energy stored can scale up readily without sacrificing the transparency of the device. Such a device is also a powerful tool for in situ optical studies of electrochemical reactions in batteries.

To circumvent the intrinsic problem of the opacity of battery electrode materials, some embodiments utilize a strategy of designing patterned electrodes with small features so that the opaque materials cover a relatively small fraction of the whole area of the device, as illustrated in FIG. 1A. The opaque battery active materials (black or darker shade) and metal current collectors (yellow or lighter shade) beneath are substantially confined inside the grid, whereas the rest of the electrode substrate is transparent. If the feature dimension of the grid is comparable or less than the resolution of human eyes (about 50-100 μm), the opaque electrode grid is indistinguishable from the transparent substrate. Consequently, the entire device appears transparent. At a transparency of α, the areal fraction of opaque electrode materials can be represented as 1−α. Moreover, by aligning multiple layers of electrodes together, the transparency does not measurably decrease, whereas the energy stored increases linearly. In contrast, the transparency of thin film electrodes decreases exponentially when more cells are stacked in series. As a result, a transparent battery with practical capacity for portable electronic devices can be accomplished using patterned electrodes on clear substrates.

Referring to FIG. 1A, the opaque electrode materials are arranged in a square or rectangular grid pattern, with one set of lines or strips (which are substantially parallel to one another) crossing over or intersecting another set of lines or strips (which are substantially parallel to one another) at an angle of about 90°. The strips can be straight or curved. The intersecting angle of the strips can be varied from 90°, such as greater than or less than 90°. For example, the intersecting angle can be in the range of about 1° to about 90°, about 5° to about 90°, about 20° to about 90°, about 45° to about 90°, about 90° to about 179°, about 90° to about 175°, about 90° to about 160°, or about 90° to about 135°.

Figure 2:
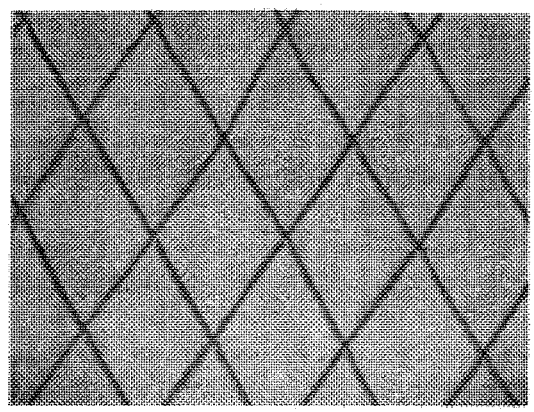
FIG. 2: (A) The schematic of a battery electrode with a crisscross pattern. (B) The schematic of a battery electrode with a honeycomb pattern. (C) The schematic of a battery electrode with a dot pattern.
Figure 2:
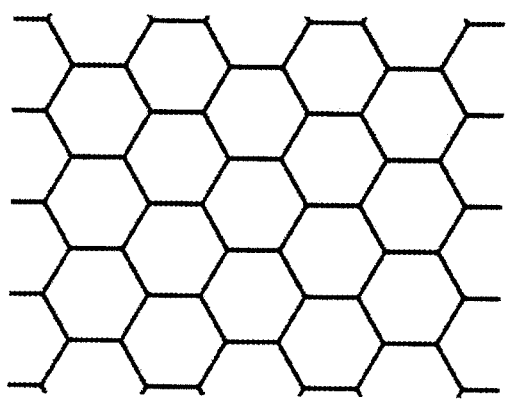
Figure 2:
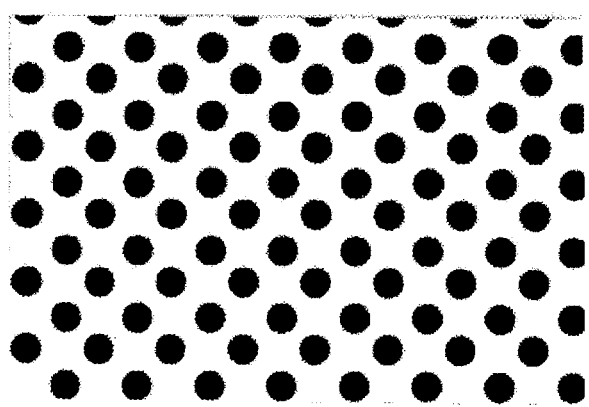

A variety of other regular or irregular patterns are contemplated, including crisscross patterns (as, for example, illustrated in FIG. 2A), honeycomb patterns (as, for example, illustrated in FIG. 2B), and dot patterns (as, for example, illustrated in FIG. 2C) including an array of dots formed with a variety of regular or irregular shapes, such as circular, half-circular, diamond-shaped, hexagonal, multi-lobal, octagonal, oval, pentagonal, rectangular, square-shaped, star-shaped, triangular, trapezoidal, wedge-shaped, and so forth. The feature dimension, such as a width of lines or strips in a grid pattern, a crisscross pattern, or a honeycomb pattern or a diameter of dots in a dot pattern, can be no greater than about 200 μm, such as no greater than about 150 μm, no greater than about 100 μm, no greater than about 50 μm, or no greater than about 10 μm, and down to about 1 μm or less. The feature spacing, such as a periodicity of lines or strips in a grid pattern or a crisscross pattern, a separation between edges of nearest neighbor, substantially parallel lines or strips in a grid pattern or a crisscross pattern, a separation between edges of opposing, substantially parallel lines or strips of a hexagon in a honeycomb pattern, or a separation between edges of nearest neighbor dots in a dot pattern, can be no greater than about 2 mm, such as no greater than about 1.5 mm or no greater than about 1 mm, and down to about 500 μm or less, such as down to about 300 μM, down to about 200 μm, down to about 100 μm, down to about 10 μm, or less. In some instances, the feature spacing is at least about 2 μm, such as at least about 10 μm, at least about 50 μm, or at least about 200 μm. The feature spacing can be substantially constant or can be varying across a surface of the substrate. In general, the areal fraction of the opaque electrode materials can be in the range of about 1% to about 99% of a surface of the substrate. In some embodiments, the areal fraction can vary from about 1% to about 90%, such as from about 1% to about 70%, from about 5% to about 70%, from about 5% to about 60%, from about 10% to about 60%, from about 5% to about 50%, from about 30% to about 50%, from about 5% to about 40%, from about 5% to about 35%, or from about 10% to about 35%. By way of example, when amount of energy storage is a controlling consideration, the opaque materials can cover a larger percentage of the surface. On the other hand, when transparency is a controlling consideration, the opaque materials can cover a smaller percentage of the surface. Alternatively or in conjunction, when balancing energy storage and transparency, it can be desirable to align and stack multiple layers of electrodes.

FIG. 1B plots the calculated transparency versus volumetric energy density of energy storage devices. Theoretical values based on active materials alone is shown with squares, whereas the circles consider the volume of all other components in a battery, including current collectors, separators, and packaging. At a transparency of about 60%, the theoretical energy density is about 100 Wh/L with packaging, which is comparable to the energy density of lead acid and NiCd rechargeable batteries. By varying the width and spacing in the grid, batteries can be fabricated with overall transparencies of about 30%, about 60%, and about 78%, as indicated by the triangles in FIG. 1B. The corresponding energy density is about 20, about 10, and about 5 Wh/L considering packaging, which establishes the feasibility of this approach. Other batteries can be fabricated with overall transparencies in the range of about 20% to about 95%, such as from about 20% to about 90%, from about 30% to about 90%, from about 30% to about 60%, from about 40% to about 90%, from about 50% to about 90%, from about 60% to about 90%, or from about 70% to about 90%, and with an overall energy density (considering packaging) in the range of about 1 Wh/L to about 300 Wh/L (or more), such as from about 1 Wh/L to about 100 Wh/L, from about 5 Wh/L to about 100 Wh/L, from about 10 Wh/L to about 100 Wh/L, from about 20 Wh/L to about 100 Wh/L, from about 30 Wh/L to about 100 Wh/L, from about 40 Wh/L to about 100 Wh/L, or from about 50 Wh/L to about 100 Wh/L. Transparencies of individual patterned electrodes can take on similar values (if not somewhat higher) than those specified above for full batteries. Transparencies can be measured in terms of transmittance at a particular wavelength (e.g., a particular wavelength in a human vision range, such as about 400 nm, about 450 nm, about 500 nm, about 550 nm, about 600 nm, about 650 nm, or about 700 nm) or across a particular range of wavelengths, such as a minimum transmittance or an average transmittance across the human vision range (e.g., from about 400 nm to about 700 nm) or another range such as from about 350 nm to about 900 nm or from about 400 nm to about 900 nm. Further improvements in energy density can be achieved by aligning and stacking multiple layers of electrodes.

Although a patterned electrode is desirable to fabricate transparent batteries, realizing such a structure presents challenges, particularly for batteries. The battery electrode is typically a thick porous film (typically about 10-300 μm), composed of heterogeneous powders with different properties: inorganic active materials, carbon black nanoparticles, and an adhesive organic binder. Moreover, the electrochemical performance of these materials can be sensitive to damage and surface modifications. Hence, conventional etching or lithography used in electronics processing may not be appropriate. Also, ink jet printing typically involves low-viscosity inks, and it can be difficult to transfer enough solid mass and print narrow lines with low-viscosity inks. Moreover, materials patterned by ink jet printing without confinement are likely to crack and diffuse away from their initial position, which may significantly decrease the transparency during long-term operation.

To overcome these challenges, a microfluidics-assisted method is used to pattern battery materials, as illustrated in FIG. 1C. This approach is related to microchannel guided assembly of nanomaterials, but uses an optimized configuration. First, a polydimethylsiloxane (PDMS) substrate (or another transparent substrate) with grid-like trenches is fabricated by spin coating a PDMS precursor onto a silicon mold and curing it at about 80° C. for about 3 h. The width of the trenches is about 35 μm in the illustrated embodiment, although other widths are contemplated, such as no greater than about 200 μm, no greater than about 150 μm, no greater than about 100 μm, no greater than about 50 μm, or no greater than about 10 μm, and down to about 1 μm or less. After the PDMS is peeled off from the silicon mold, a 100-nm gold film (or a film of another metal or other electrically conductive material) is evaporated or otherwise applied onto it as the current collector. Then, the sample is treated in air plasma for about 90 s to render its surface hydrophilic. A thin slide of PDMS, referred to as the blocking PDMS in step 3, is placed at one end of the trenches to form a narrow region of closed channels (about 2-3 mm in length). After an aqueous slurry solution containing the active electrode material (about 18-20 wt % in water) is dropped onto one side of the blocking PDMS, capillary forces pull it into the closed channels, from which it continues to flow through most or all of the trenches in the device. The flow speed is about 1 cm/s, but can be varied to other values, such as in the range of about 0.1 cm/s to about 10 cm/s. Another substrate can be substituted in place of the PDMS substrate, such as another substrate including either, or both, a plastic and a glass. In general, a substrate can be flexible or rigid, and can have a transparency in the range of about 20% to about 98%, such as from about 30% to about 98%, from about 50% to about 98%, from about 70% to about 98%, from about 80% to about 98%, from about 85% to about 98%, or from about 90% to about 98%.

Nano-sized active materials can fill the trenches more quickly and evenly than micron-sized particles. This is likely because nano-sized materials do not clog the channels easily even when the slurry solution is concentrated. As a result, some embodiments use $LiMn_2O_4$ nanorods and $Li_4Ti_5O_{12}$ nanopowder as cathode and anode active materials, respectively. Other examples of suitable cathode active materials include phosphates, fluorophosphates, fluorosulphates, spinels, and silicates, which can include any, or a combination, of manganese, cobalt, and nickel. Other examples of suitable anode active materials include lithium, graphite ($Li_xC_6$), and other carbon, tin, germanium, silicon, silicide, silicate, or oxide-based anode materials.

More generally, examples of suitable active materials include lithium-ion intercalation materials that can undergo an intercalation/de-intercalation reaction with lithium ions, such as lithium transition metal oxides (e.g., lithium manganese oxide ($LiMn_2O_4$), lithium cobalt oxide ($LiCoO_2$), lithium nickel oxide ($LiNiO_2$), lithium titanium oxide ($Li_4Ti_5O_{12}$), $LiCo_{1/3}Ni_{1/3}Mn_{1/3}O_2$, and $Li(Li_aNi_xMn_yCo_z)O_2$), lithium transition metal phosphates (e.g., lithium titanium phosphate ($LiTi_2(PO_4)_3$)) and lithium iron phosphate ($LiFePO_4$)), and lithium transition metal fluorophosphates (e.g., lithium iron fluorophosphate ($Li_2FePO_4F$)).

Additional examples of suitable active materials include intercalation materials that can undergo an intercalation/de-intercalation reaction with other ions different from lithium ions, such as ions having a larger crystallographic diameter than lithium ions. Such intercalation materials include sodium-ion intercalation materials, such as transition metal oxides (e.g., tungsten oxide ($WO_3$) and vanadium oxide ($V_2O_5$)) and sodium transition metal oxides (e.g., sodium manganese oxide ($Na_4Mn_9O_{18}$)), and potassium-ion intercalation materials, such as transition metal oxides (e.g., tungsten oxide ($WO_3$) and vanadium oxide ($V_2O_5$)).

An analytical model on the estimate of the flow speed can be derived based on closed round channels. The filling length L is represented as $[(R\gamma \cos\theta)/2\mu]^{1/2}t^{1/2}$, where R is the radius of channel, $\gamma$ is the surface tension of water, $\theta$ is the contact angle, $\mu$ is the viscosity of the slurry solution, and t is time. The time to fill a 1-cm channel can take about 0.4 s, which is consistent with observations (see Examples for more details). The filling speed can be further increased by lowering the viscosity of the solution. This filling speed has the same order of magnitude as the rate of a conventional coating method for battery electrodes, suggesting its compatibility with large-scale production.

After drying and removing the blocking PDMS, most or all of the trenches are filled with the battery electrode material. The next step is to peel off or otherwise remove the extra gold on top of the PDMS substrate with a Kapton tape. The gold film is readily removed due to a low surface energy of PDMS (about 19.8 $J/m^2$). This process results in the fabrication of a single transparent electrode with both the metal current collector and electrode active material confined in microtrenches. Next, two electrodes fabricated in such manner and a piece of transparent gel electrolyte are assembled together. If the grid patterns in the two electrodes do not match well to each other, the transparency will decrease exponentially upon stacking, as in the case of thin film electrodes. Cell assembly is performed manually under optical microscopy at a magnification of about 20×, which results in an accuracy better than about 10 µm in terms of displacement. This assembly process can be done automatically in large-scale battery production with even better aligning accuracy. Finally, the sandwich structure is sealed inside a transparent polymer bag with two pieces of aluminum strip extending out as the current collector, which has a similar configuration as a pouch cell, except that all components are transparent.

Figure 3:
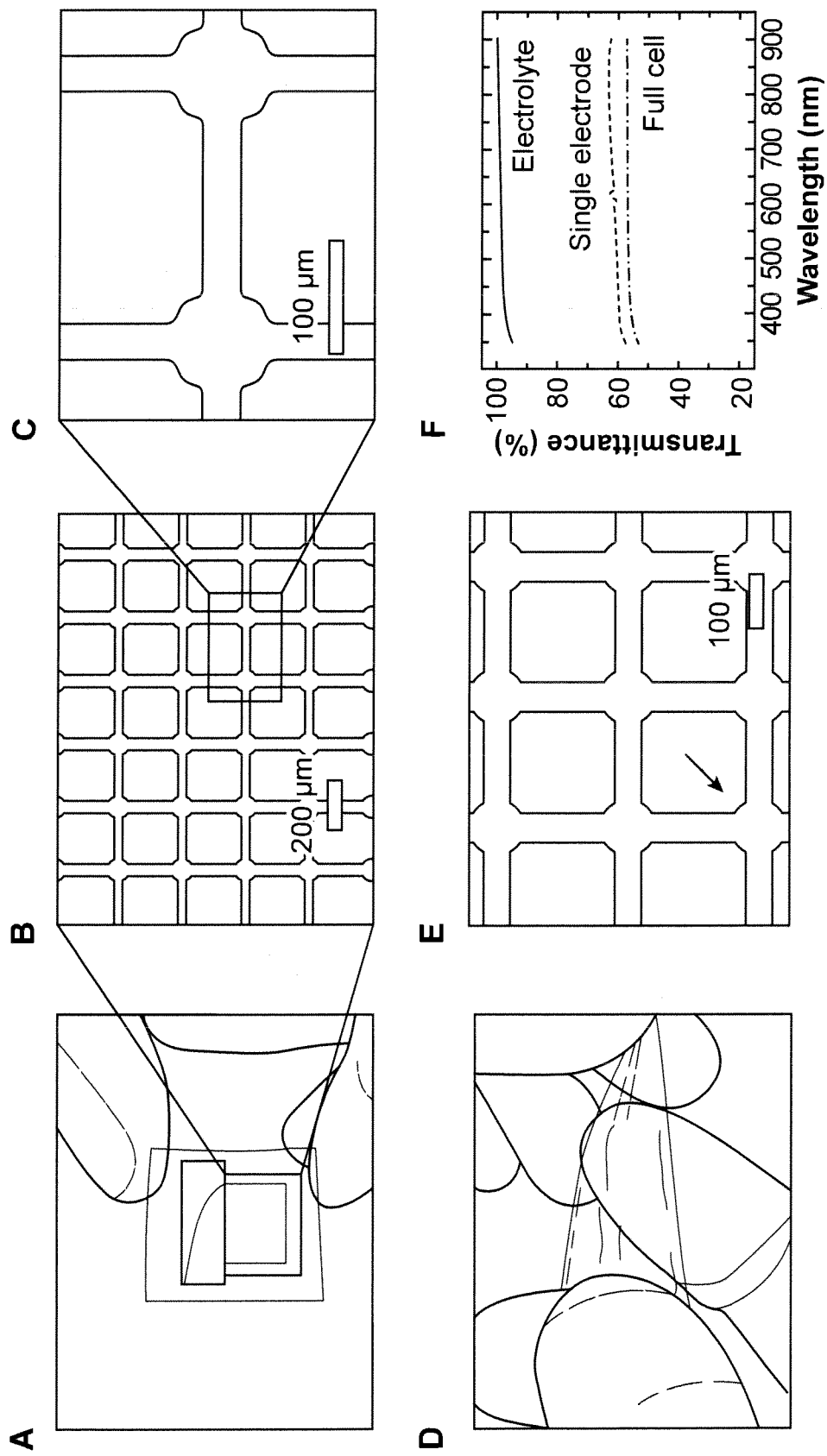
FIG. 3: (A) Photographic image of a transparent and flexible battery electrode. (B and C) Magnified optical image (B) and SEM image (C) of the battery electrode. Electrode materials are confined inside the trenches. (D) Transparent, flexible, and stretchable gel electrolyte. (E) Optical microscopic image of a full battery with electrodes matched to each other. A small mismatch (bottom left) is marked by the arrow. (F) The UV-VIS spectrum of a gel electrolyte, a single electrode, and a full battery.

FIG. 3A through FIG. 3C show a series of images of an as-fabricated single transparent electrode on a polyethylene naphthalate substrate at different magnifications. The areal fraction of trenches is about 35%, indicating a theoretical transparency of about 65%. Characters behind the electrode can be seen clearly in the camera image (FIG. 3A). The electrode is also bendable and flexible. High magnification optical images (FIG. 3B) and the SEM image (FIG. 3C) illustrate that the electrode materials are confined to the interior of the trenches, demonstrating that the microfluidics-assisted method is successful in patterning battery electrodes. An optical microscope is used to study the uniformity and thickness of battery electrode materials inside the trenches. The average thickness is about 50 µm, which is about 70% of the trench depth and comparable with the thickness of electrode materials in commercial batteries. Moreover, this portion is much higher than the concentration of solid material in the slurry (about 18-20%), suggesting that the solution keeps moving toward the end of trenches upon evaporation of water. The standard deviation of the thickness is about 4 µm, corresponding to a small variation of about 8% over the whole device. This indicates that the microfluidics-assisted method forms a uniform electrode film and that the mass loading is suitable for practical use. Other electrodes can be fabricated in which a thickness of battery electrode materials inside trenches is up to about 500 µm, such as up to about 300 µm, up to about 200 µm, or up to about 100 µm, and down to about 40 µm or less, such as down to about 30 µm, down to about 20 µm, down to about 10 µm, down to about 5 µm, down to about 1 µm, or less.

Along with the electrodes, a separator between the cathode and the anode is included to avoid internal shorting. However, common separators made of polypropylene and polyethylene are opaque. Therefore, a transparent gel electrolyte, which also acts as a separator, is used to solve this problem. In some embodiments, a gel electrolyte of poly(vinylidene fluoride-cohexafluoropropylene) (PVDF-HFP) membrane permeated with 1 M $LiClO_4$ in ethylene carbonate/diethyl carbonate (EC/DEC) is developed. The gel membrane is elastic and highly transparent, as illustrated in FIG. 3D.

As mentioned before, grid structures in electrodes should align with each other to achieve high transparency and high energy storage at the same time. This is accomplished by matching the electrodes manually under a microscope, but can be achieved automatically in large-scale production. FIG. 3E shows an optical image of an assembled transparent Li-ion battery with two electrodes and a gel electrolyte membrane in between. It can be observed that the two electrodes align well with each other, and a small mismatch is observed at the bottom left corner.

To quantitatively determine the transparency of battery components and the full device, UV-visible (UV-Vis) spectroscopy is used to measure the transmittance of each component, as plotted in FIG. 3F. The gel electrolyte exhibits transmittance of about 99%, so its effect on the transparency of the full battery is negligible. A single electrode without packaging showed a transmittance of about 62% in the visible and near infrared, which is about 3% lower than the theoretical value based on the area of battery materials in the design. The difference may originate from the coverage area of the battery material, but may also occur because the UV-Vis spectrum measures the direct transmittance, but not the diffuse transmittance. The full cell with packaging exhibits a transmittance of about 57%. The 5% difference in transmittance between a single electrode and a full cell is likely a result of the small mismatch (about 3-5 μm) between the two electrodes, which is consistent with observations from optical microscopy images (FIG. 3E), or a small amount of absorption from the packaging. Nevertheless, the transmittance of the full cell is much higher than two electrodes randomly stacked (about $0.65^2$ or about 42%). When more electrodes are stacked together, the difference can be even more significant. For example, a device with three full cells in series can exhibit a transparency less than 10% if they are randomly oriented. In contrast, well-aligned cells can show transparency similar to an individual electrode (e.g., about 60%).

The electrochemical behavior of each component can also be examined. PDMS and gold are not typically used in batteries. PDMS can be used as a component in a copolymer electrolyte. Gold is inert in the range of about 1.0-4.4 V versus Li/Li$^+$, in which the operating potential range of the chosen cathode (about 3.5-4.25 V versus Li/Li$^+$ for LiMn$_2$O$_4$) and anode (about 1.3-1.8 V versus Li/Li$^+$ for Li$_4$Ti$_5$O$_{12}$) lie. To further test the stability of the gold film on PDMS, cyclic voltammetry was performed, showing little reaction with lithium in the potential window. A small anodic peak is observed at 2.1 V, but it disappears after several scans. This indicates that the initial Coulomb efficiency might be slightly low at the anode side (Li$_4$Ti$_5$O$_{12}$). However, the current density is less than about 10 μA/cm$^2$ at 2 mV/s, which is much less than the current used in charging/discharging batteries (about 100 μA/cm$^2$). Furthermore, because the peak diminishes quickly upon scanning and does not remain within the potential window for the full cell, this side reaction has little effect on battery performance after the first cycle. This conclusion is also supported by full cell cycling data discussed in the following.

Figure 4:
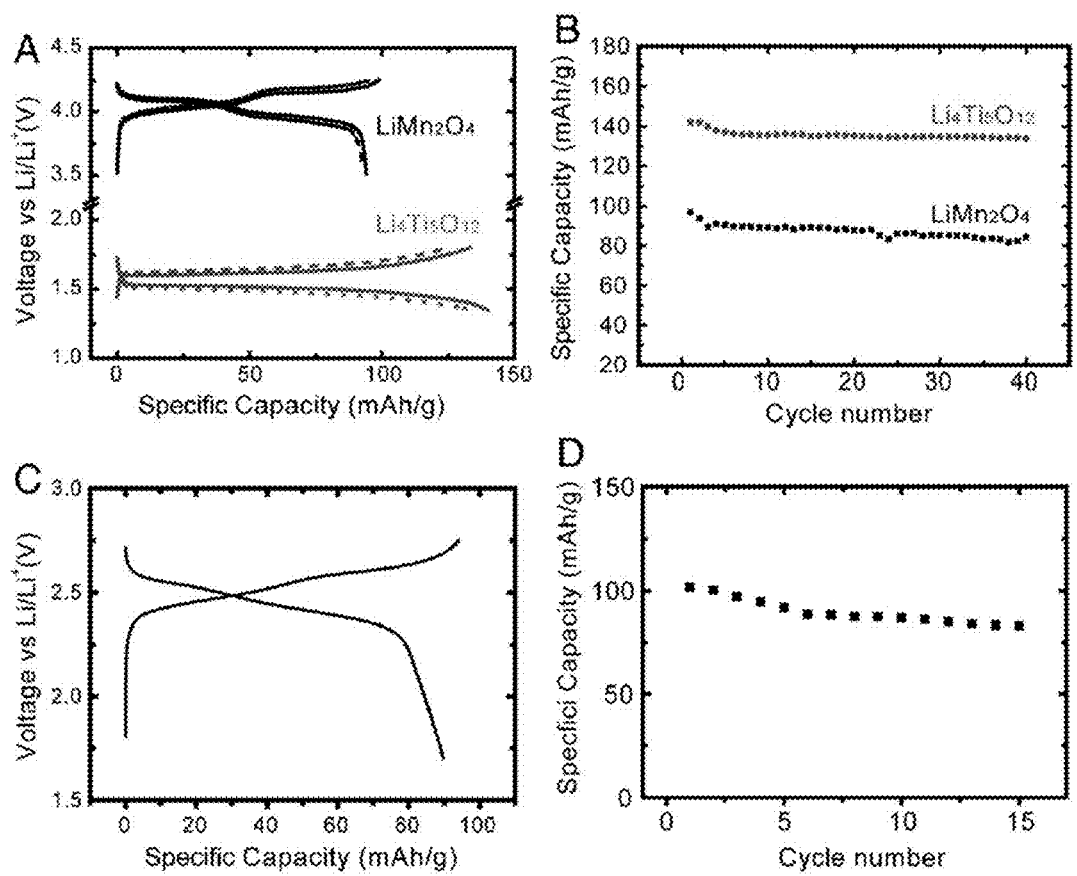
FIG. 4: (A and B) The voltage profile (A) and the cycling performance (B) of a transparent cathode ($LiMn_2O_4$ nanorods) and anode ($Li_4Ti_5O_{12}$ nanoparticles) in half cells with lithium as the counter electrode. Solid and dashed lines represent as-fabricated electrodes and electrodes after bending to 2 cm in radius 100 times, respectively. The applied current is about 100 $\mu A/cm^2$. The transparency of electrodes is about 65%. (C and D) The voltage profile (C) and the cycling performance (D) of a transparent $LiMn_2O_4/Li_4Ti_5O_{12}$ full cell with transparency of about 60%. The current is about 100 $\mu A/cm^2$.

FIG. 4A exhibits the typical voltage profiles of Li$_4$Ti$_5$O$_{12}$ nanopowder and LiMn$_2$O$_4$ nanorods, respectively. The profiles are similar to those observed in conventional battery electrodes, and no significant overpotential is observed. To quantitatively understand how the grid design affects the voltage profile, the resistance of the transparent electrodes is measured. The sheet resistance is about 60 Ω/sq for both electrodes, suggesting an additional overpotential of about 3 mV in half cells at about 100 μA/cm$^2$. Other transparent electrodes can be fabricated in which the sheet resistance is no greater than about 500 Ω/sq, no greater than about 400 Ω/sq, no greater than about 350 Ω/sq, no greater than about 300 Ω/sq, no greater than about 200 Ω/sq, no greater than about 100 Ω/sq, no greater than about 75 Ω/sq, no greater than about 50 Ω/sq, or no greater than about 25 Ω/sq, and down to about 10 Ω/sq, down to about 1 Ω/sq, or less.

The electrode is also flexible. Even after repeatedly bending down to a radius of about 2 cm 100 times, the sheet resistance is still less than about 100 Ω/sq. After bending, a slightly higher overpotential is observed, and the corresponding capacity is less than 5% lower than before bending (FIG. 4A, dashed line). Resistances of the electrode bent to different radii are measured, and no dramatic change is observed at radii above 1 cm. The good flexibility of transparent electrodes can be attributed to two reasons: (i) the flexibility of PDMS and (ii) conductive carbon black can bridge cracked gold electrode pieces. The cycling performance of these transparent electrodes is shown in FIG. 4B. The LiMn$_2$O$_4$ nanorod and Li$_4$Ti$_5$O$_{12}$ nanopowder electrodes can have initial discharge capacities of about 97 mAh/g (or more) and about 142 mAh/g (or more) and capacity retentions of about 87% (or more) and about 93% (or more) after 40 cycles at 100 μA/cm$^2$, respectively. To derive the specific capacity, the mass loading is calculated based on the tapping density and the thickness of the electrode film. The tapping density is estimated from electrode films with the same composition coated by doctor blading, which is about 1.1 g/cm$^3$ for LiMn$_2$O$_4$ and about 1.2 g/cm$^3$ for Li$_4$Ti$_5$O$_{12}$ electrodes, respectively. As a result, the estimated mass loading is about 1.8 mg/cm$^2$ for LiMn$_2$O$_4$ and about 1.9 mg/cm$^2$ for Li$_4$Ti$_5$O$_{12}$. The Coulomb efficiency is above 97% for both electrodes. Passivation of PDMS with transparent materials (e.g., polymer or oxides) can further improve the Coulomb efficiency. Impedance measurements show that the transparent gel electrolyte has an ionic conductivity of about $2 \times 10^{-3}$ S/cm, which satisfies the specifications for commercial batteries.

The transparent full cell is fabricated by sealing LiMn$_2$O$_4$ electrode/gel electrolyte/Li$_4$Ti$_5$O$_{12}$ electrode inside a transparent plastic bag, which has a similar configuration as a pouch cell. FIG. 4C and FIG. 4D show the voltage profile and cycling performance, respectively. The average discharge voltage is about 2.4 V, consistent with the difference between LiMn$_2$O$_4$ and Li$_4$Ti$_5$O$_{12}$. The initial discharge capacity is about 100 mAh/g (or more), and the capacity remains over about 80 mAh/g (or more) after 15 cycles.

Figure 5:
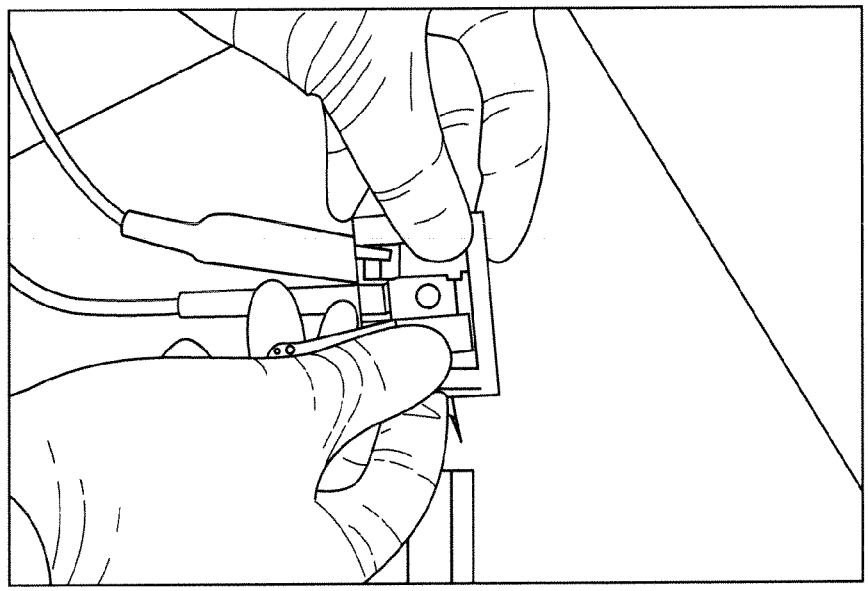
FIG. 5: (A) A transparent battery lighting a red LED. The cell is sealed with Kapton tape. The LED is placed behind the battery so that light shines through the transparent battery. (B) In situ Raman spectrum of $Li_xMn_2O_4$ nanorods at different charging states (x) measured in a transparent battery. The two peaks at 498 and 717 $cm^{-1}$ belong to PDMS, whereas peaks at 625 and 597 $cm^{-1}$ can be assigned to $LiMn_2O_4$ and $\lambda$-$MnO_2$, respectively.
Figure 5:
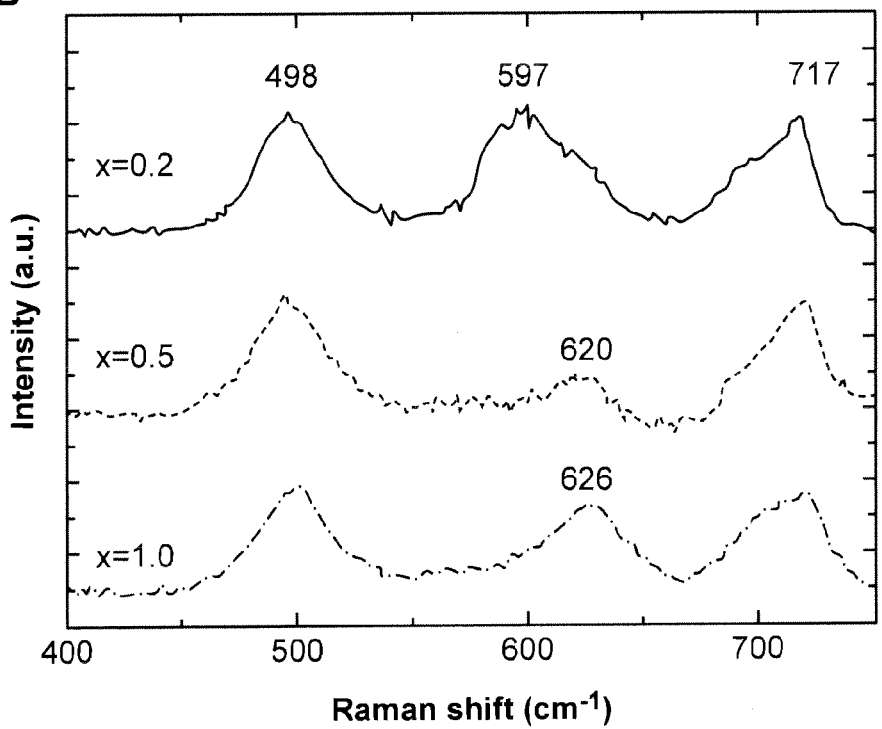

To demonstrate practical applications, the transparent full cell is used to repeatedly light a red light emitting diode (LED), as shown in FIG. 5A. The LED is placed behind a transparent battery, and light shines through the battery. The energy density of this full cell is about 50 Wh/L based on active electrode materials alone and about 10 Wh/L including all components.

Besides applications in transparent electronics, the transparent battery is also a useful research tool for scientific studies. As the cell is transparent, electrode materials are visible. Consequently, optical methods, such as Raman spectroscopy and FTIR, can be applied to in situ studies of electrode materials. Furthermore, as the electrode is well patterned, it is possible to investigate the effect of geometry on the charge/discharge of electrode materials. FIG. 5B shows in situ micro-Raman spectra collected in a transparent battery. In this case, the two electrodes are slightly mismatched so that the laser (Ar$^+$, 514 nm) illuminates on the LiMn$_2$O$_4$ electrode. Three spectra are collected upon charging, corresponding to x=1.0, 0.5, and 0.2 in Li$_x$Mn$_2$O$_4$. Two peaks at 498 and 717 cm$^{-1}$ originate from PDMS and do not change in all three spectra. PDMS exhibits another small peak at 612 cm$^{-1}$, which is covered by the peak at 626 cm$^{-1}$, the A$_{1g}$ mode in LiMn$_2$O$_4$. When x decreases to 0.5, this peak becomes lower and shifts to 620 cm$^{-1}$. After more lithium is extracted and x further decreases down to 0.2, a strong peak at 597 cm$^{-1}$ is observed, corresponding to the A$_{1g}$ mode in λ-MnO$_2$. The observation of the evolution of Raman peaks demonstrates the feasibility of using a transparent battery for an in situ optical spectroscopy study of fundamental electrochemical reactions.

The theoretical energy density with packaging is about 100 Wh/L, about one order of magnitude higher than the transparent battery demonstrated in a particular embodiment. The difference mainly comes from a thick PDMS substrate (about 100 μm) and thin electrode film (about 50 μm). With further optimization, including reducing the thickness of PDMS substrate, increasing the depth of the trenches and using materials with higher specific capacity and tapping density (e.g., LiCoO$_2$), the energy density can be increased to over 50 Wh/L. Moreover, in some types of portable electronic devices and miniaturized devices, the footprint area is limited, but the restriction on device thickness is less stringent. As a result, the energy per area can be more important than the energy per volume for certain applications. Given the opportunity to stack multiple cells in series, which increases the areal energy density without sacrificing the transparency, an electrode grid design is favorable compared to thin film designs and can result in practical transparent batteries.

By way of conclusion, described herein is an approach to pattern electrodes at the micron scale to fabricate transparent batteries and other transparent energy storage devices, which can function as the power supply in transparent electronics. As the feature dimension of the patterned electrode is less than the resolution of human eyes, opaque electrode materials are effectively indistinguishable from a transparent substrate, resulting in a transparent electrode. The grid-like structure of the electrode is achieved through a method based on a microfluidics technique, which allows the fabrication of battery electrodes with a well-defined grid structure. Furthermore, by aligning multiple electrodes together, the transparency does not measurably decrease, whereas the energy stored in the battery increases linearly with the number of electrodes.

The transparent electrodes described herein can be incorporated in a variety of energy storage devices, including batteries, such as Li-ion batteries, and supercapacitors. In turn, the resulting transparent energy storage devices can be incorporated in a variety of electronic and optoelectronic devices to render those devices transparent, including cell phones, tablet computers, portable media players, handheld game consoles, and other portable electronic devices.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Materials and Methods

Fabrication of PDMS Substrate:

PDMS substrate with grid trenches is fabricated by spin coating PDMS precursor onto a silicon mold patterned by photolithography. Specifically, a grid-like structure is first patterned on about 1.6-μm thick photoresist (Shipley 3612) by photolithography, and the photoresist is hardened by UV light (254-nm wavelength, 24 mW/cm$^2$) for about 15 min. For dry etching, an inductive charged plasma deep reactive ion etcher (Surface Technology Systems) is used with the standard Bosch process. The etching rate is about 2.04 μm/min for Si and about 12 Å/min for photoresist. The depth of trenches is about 70 μm.

After cleaning with acetone, the silicon mold is treated with trimethylchlorosilane (Sigma Aldrich) before coating PDMS. Sylgard 184 (Dow Corning Corp) is used as the PDMS precursor. The base compound and curing agent are mixed in about 15:1 ratio by weight. Then the mixture is spin coated onto the silicon mold followed by curing at about 80° C. for about 3 h. The final thickness of the film is about 100 μm. The PDMS film is carefully peeled off from the silicon mold and placed onto a transparent substrate, such as polyethylene naphthalate (PEN) plastic or glass.

Battery Electrode Formation:

About 100-nm gold is first evaporated onto the PDMS substrate as the current collector. The substrate is then treated in air plasma for about 90 s to render the surface hydrophilic. The battery electrode material solution is filled in by a microfluidics-assisted method. The electrode material is composed of about 90% active materials (LiMn$_2$O$_4$ nanorods or Li$_4$Ti$_5$O$_{12}$ nanopowders), about 7% Super P carbon black, and about 3% styrene-butadiene-rubber-based aqueous binder (Pred materials and LICO). LiMn$_2$O$_4$ nanorods are synthesized by annealing a mixture of β-MnO$_2$ nanorods and lithium acetate, as discussed in Yang Y, et al., "Single nanorod devices for battery diagnostics: A case study on LiMn$_2$O$_4$," Nano Lett 9:4109-4114 (2009), the disclosure of which is incorporated herein by reference in its entirety. Li$_4$Ti$_5$O$_{12}$ powders are received from Hydro-Québec. The suitable concentration of solid materials in the final aqueous solution is about 18-20%.

To introduce the slurry solution to the predesigned trenches, a thin slide of PDMS is placed at one end of the electrode region to form an area of closed channels. This slide is referred to as the blocking PDMS. Then the slurry solution is dropped onto one side of the channels. Because of capillary forces, the aqueous slurry can be drawn into channels under the blocking PDMS and then kept flowing in the channels without PDMS cover. The flowing speed is about 1 cm/s. Then the solution is dried naturally, and the blocking PDMS piece is removed. The electrode is further dried at about 100° C. under vacuum over night to further remove water residue. Finally, a piece of Kapton tape is carefully pressed onto the PDMS substrate, and extra gold film is peeled off.

Gel Electrolyte:

The gel electrolyte is made as follows: about 2 mL 1 M LiClO$_4$ in ethylene carbonate/diethyl carbonate (EC/DEC) (about 50:50 vol) and about 0.8 g poly(vinylidene fluoride-co-hexafluoropropylene) (PVdF-HFP, Kynar 2801) is dissolved in about 12 mL tetrahydrofuran (THF, Sigma Aldrich). After stirring overnight, the clear solution is drop cast onto a glass slide. Then the solution is vacuum dried for about 2 h to remove THF, and a translucent gel membrane is formed. Then the membrane is peeled off from the glass substrate and soaked in about 1 M LiClO$_4$ in EC/DEC to turn it transparent again.

Battery Assembly:

To make a full cell, aluminum strip is wrapped onto the side of each electrode as the current collector. Then, gel electrolyte is placed on the anode electrode first, and the transparent cathode is put on the anode under optical microscope at 20×. The full cell is sealed inside a poly(vinyl chloride) (PVC) thermoplastic bag with aluminum strips extending outside the bag. The cell configuration is similar to a pouch cell except that all components are transparent.

Thickness Measurement:

The thickness of electrode materials is determined by an optical method. First, the depth of trenches on PDMS (L) is measured by focusing on the surface of the top and the bottom of trenches and calculating the difference between their relative heights. Then the gap between PDMS top and electrode materials surface (l) is measured in the same way. As a result, the thickness of electrode film at a certain point is represented as L–l. The resolution of such method depends on the focus depth of the microscope. At the highest resolution, the resolution is about 1-2 μm.

Electrochemical Measurement:

Electrochemical performance of half cells is investigated by sealing the electrode in a transparent plastic bag in an argon-filled glove box with oxygen and water contents below about 1 and about 0.1 ppm, respectively. In half cells, lithium foil (Alfa Aesar) is used as the counter electrode, and the gel electrolyte membrane is placed between lithium and the transparent electrode. For the full cell test, the gel electrolyte membrane is sandwiched between two pieces of transparent electrodes. For cyclic voltammetry measurement, three-electrode configuration is used. A piece of lithium foil larger than the PDMS/gold working electrode is used as the counter electrode. The reference electrode is a small piece of lithium foil ($2 \times 2$ mm$^2$), which is sandwiched between the counter and the working electrode.

Transmittance Test:

UV-visible (UV-Vis) spectroscopy (Shimadzu UV-1700) is used to determine the transmittance of samples in the wavelength range of 350-900 nm. The sample is placed on a piece of glass slide for the test with a clean glass slide as the reference.

Raman Spectroscopy Measurement:

A Renishaw RM1000 Raman microscope is used for Raman spectroscopy. This system uses a 514-nm Ar$^+$ ion laser excitation line and has 2-cm$^{-1}$ spectra resolution and 1-μm spatial resolution. The spot size is about 5 μm.

Example 2

Performance of Tin-Doped Indium Oxide (ITO) Thin Film Electrode

Figure 6:
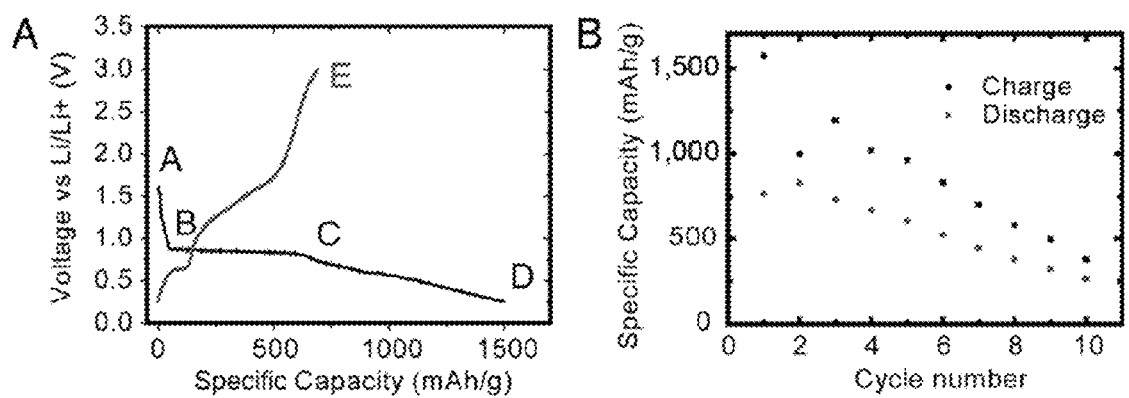
FIG. 6: (A and B) The voltage profile (A) and the cycling performance (B) of a 250-nm thick ITO film on glass.

To evaluate whether common transparent materials, such as ITO and ZnO, are suitable for transparent batteries, the lithiation process of ITO thin film on glass substrate is investigated. FIG. 6A shows the voltage profile of the initial charge/discharge of a 250-nm ITO film. The large voltage hysteresis and dramatic difference between the charge and the discharge capacity indicate that battery performance is poor. The cycling performance of the ITO thin film is also poor, as shown in FIG. 6B. Such poor performance is also observed in ZnO.

Figure 7:
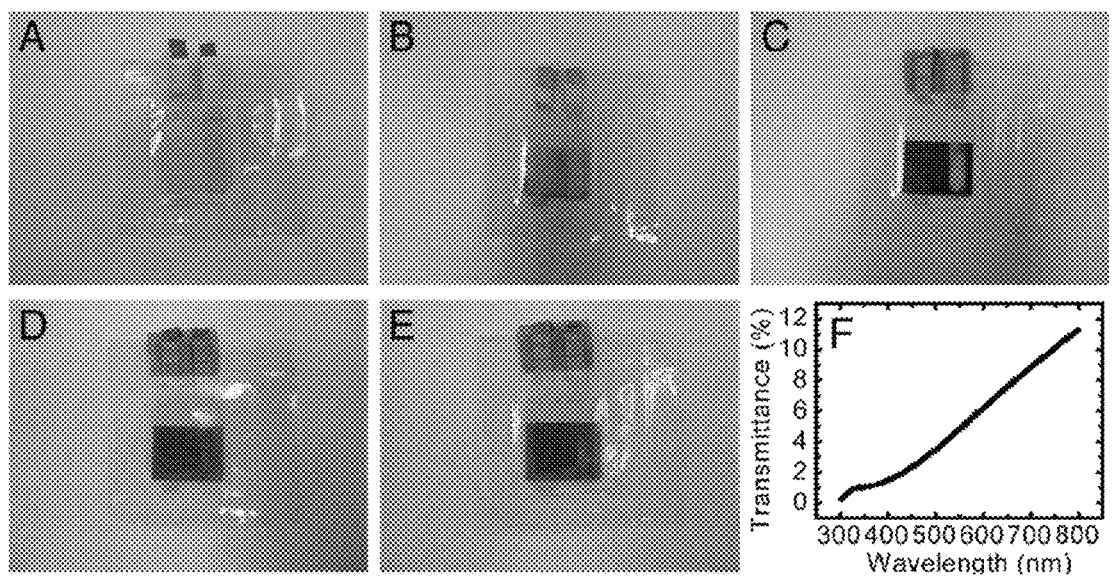
FIG. 7: (A-E) Camera images of the ITO film at different charge/discharge states. A-E correspond to A-E in FIG. 5. (F) UV-Vis spectroscopy of an ITO thin film after two cycles (state D).

FIG. 7 (A-E) show camera images of the ITO sample at different charge/discharge states. As can be observed, the ITO film becomes dark and opaque after a small amount of lithiation. Moreover, the transparency does not recover even after charging back (FIG. 7E). The transmittance of the ITO film after two cycles is also measured. The transmittance averages 5% in the visible light regime for this 250-nm thin film (FIG. 7F).

Example 3

Energy Density Calculation of Transparent Batteries

The energy density (E) of a transparent battery is calculated using:

$$E = (1-\alpha)p\frac{C_c \times C_a}{C_c + C_a}(V_c - V_a).$$

$1-\alpha$ is the fraction of area covered by electrode materials; thus the theoretical transparency is $\alpha$. p is the ratio of the thickness of electrode material layer to the whole cell. C indicates the capacity per volume, and V is the average potential versus Li/Li$^+$. The subscripts c and a represent cathode and anode, respectively.

For the theoretical volumetric energy density without packaging, the actual density of battery material is used. $C_c=140$ mAh/g$\times 4.9$ g/cm$^3=686$ mAh/cm$^3$ for LiCoO$_2$, and $C_a=372$ mAh/g$\times 2.2$ g/cm$^3=818$ mAh/cm$^3$ for graphite. $V_c-V_a=3.7$ V, and p=1. As a result, at 80% transparency, the volumetric energy density is $$(1-0.8)\times(686\times818)/(686+818)\times3.7=276 \text{ Wh/L.}$$

For the theoretical volumetric energy density with packaging, the tapping density of battery material is used. The fraction of active materials is set to 90% as the weight of carbon black and binder is also considered. $C_c=140$ mAh/g$\times 3.0$ g/cm$^3\times 0.9=378$ mAh/cm$^3$ for LiCoO$_2$, and $C_a=372$ mAh/g$\times 1.2$ g/cm$^3\times 0.9=402$ mAh/cm$^3$ for graphite. $V_c-V_a=3.7$ V, and p is set to ⅓ as in commercial Li-ion batteries. An extra transparency loss of 5% is considered due to other reasons, such as mismatch, dirt, and packaging. For example, at 80% transparency, the volumetric energy density is $$(1-0.8-0.05)\times(378\times402)/(378+402)\times3.7/3=40 \text{ Wh/L.}$$

For the values set forth herein, the measured tapping density is used, which is 1.1 g/cm$^3$ and 1.2 g/cm$^3$ for LiMn$_2$O$_4$ and Li$_4$Ti$_5$O$_{12}$, respectively. The fraction of active materials is 90% in the electrode. As a result, $C_c=100$ mAh/g$\times 1.1$ g/cm$^3\times 0.9=99$ mAh/cm$^3$ for LiMn$_2$O$_4$, and $C_a=140$ mAh/g$\times 1.2$ g/cm$^3\times 0.9=151$ mAh/cm$^3$ for Li$_4$Ti$_5$O$_{12}$. $V_c-V_a=2.6$ V, $\alpha=0.33$, and p=$50\times2/(50\times2+100\times2+50+75\times2)=$⅕, where the thickness of active material is 50 μm, the thickness of PDMS is 100 μm, the thickness of polymer electrolyte is 50 μm, and the packaging thickness is 75 μm on each side. The achieved volumetric energy density is $$0.33\times(99\times150/(99+151)\times2.4\times\tfrac{1}{5}=10 \text{ Wh/L.}$$

p value in this calculation is ⅕, whereas in a typical battery the value is about ⅓.

Example 4

Thickness Distribution of Electrode Materials

Figure 8:
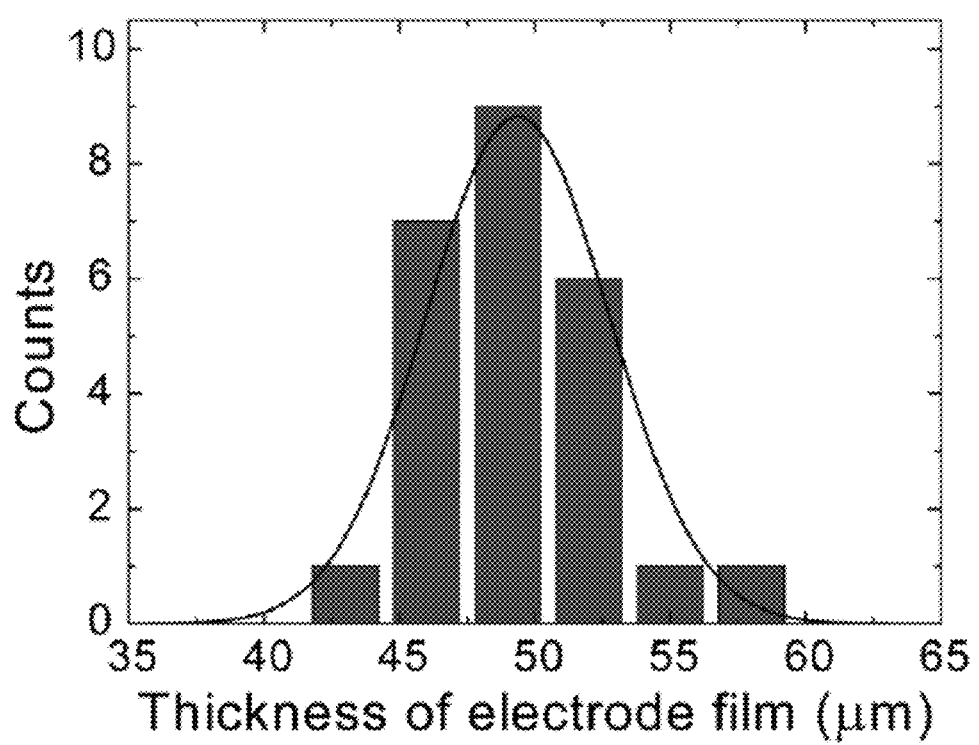
FIG. 8: The distribution of electrode thickness over a single electrode.

FIG. 8 shows the distribution of electrode thickness over the whole device (1 cm$^2$). The sample size is 25. The average thickness is 50±4 μm.

Example 5

Microfluidic Channel Modeling

Based on Navier-Stokes equations of Poiseuille flow neglecting gravity, $$\nabla \cdot V = 0, \mu\nabla^2 V = \nabla p_c,$$

for a circular channel of radius R $$V(t) = \frac{dL(t)}{dt} = \frac{\Delta p R^2}{8\mu}\frac{1}{L(t)},$$

the capillary force at the meniscus can be represented as $$L(t) = [(R\gamma\cos\theta)/2\mu]^{1/2}t^{1/2}$$

and $$v = \left(\frac{R\gamma\cos\theta}{8\mu}\right)^{1/2}t^{-1/2}.$$

Solving this equation with boundary condition of L(t)=0 at t=0, $$\Delta p = p_c = \frac{2\pi r \gamma \cos\theta}{\pi r^2} = \frac{2\gamma \cos\theta}{r}.$$

In this calculation, R=25 µm, γ=0.07 N/m, θ=15°, and µ=3×10⁻³ Ns/m² as measured, so the time taken to fill a 1-cm channel is 0.4 s.

Example 6

Cyclic Voltammetry Measurement on PDMS/Au

Figure 9:
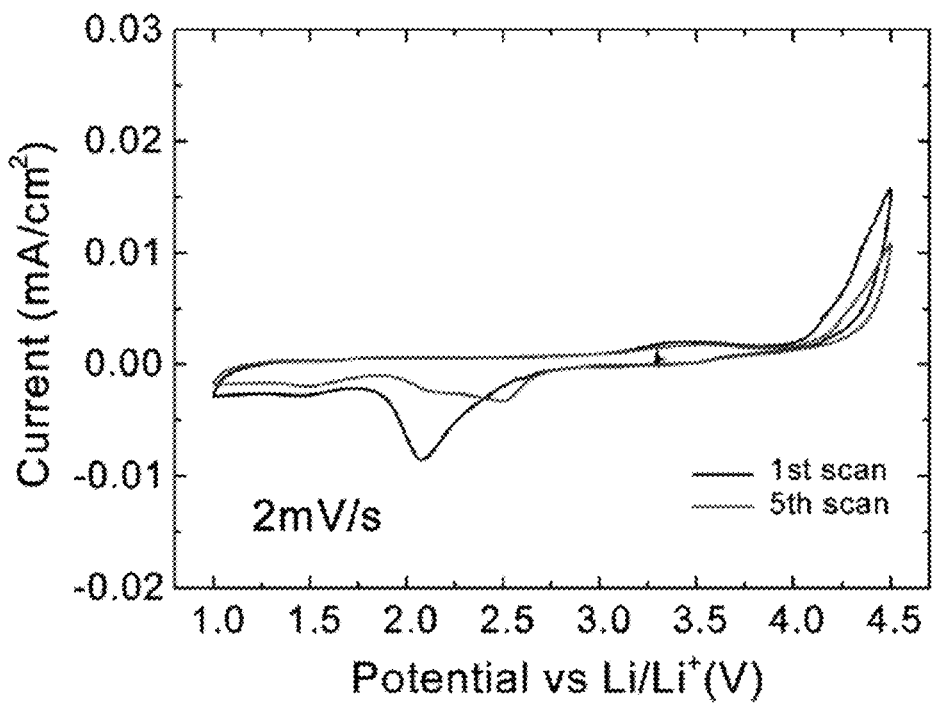
FIG. 9: Cyclic voltammetry measurement on a PDMS substrate with 100 nm gold evaporated on top.

The cyclic voltammetry measurement is carried out on a PDMS substrate with 100-nm gold evaporated on top (FIG. 9).

Example 7

Flexibility Test

Figure 10:
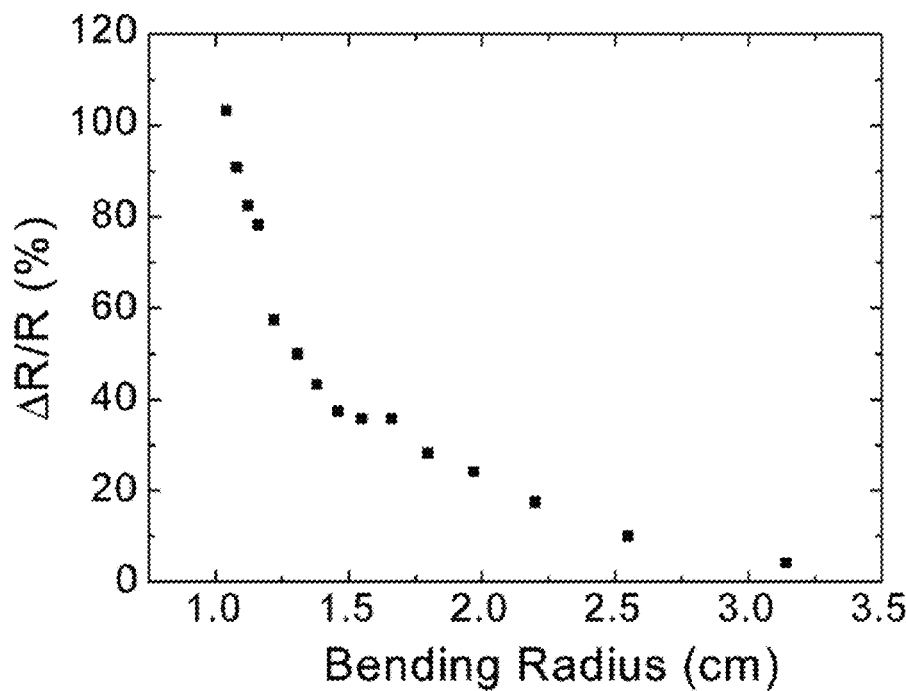
FIG. 10: The resistance of a transparent electrode upon bending.

The transparent battery electrode on PEN substrate is bent by a syringe pump. After bending down to a radius of 1 cm, the resistance increases by about 100% (FIG. 10).

Example 8

Impedance Spectroscopy on the Polymer Electrolyte

Figure 11:
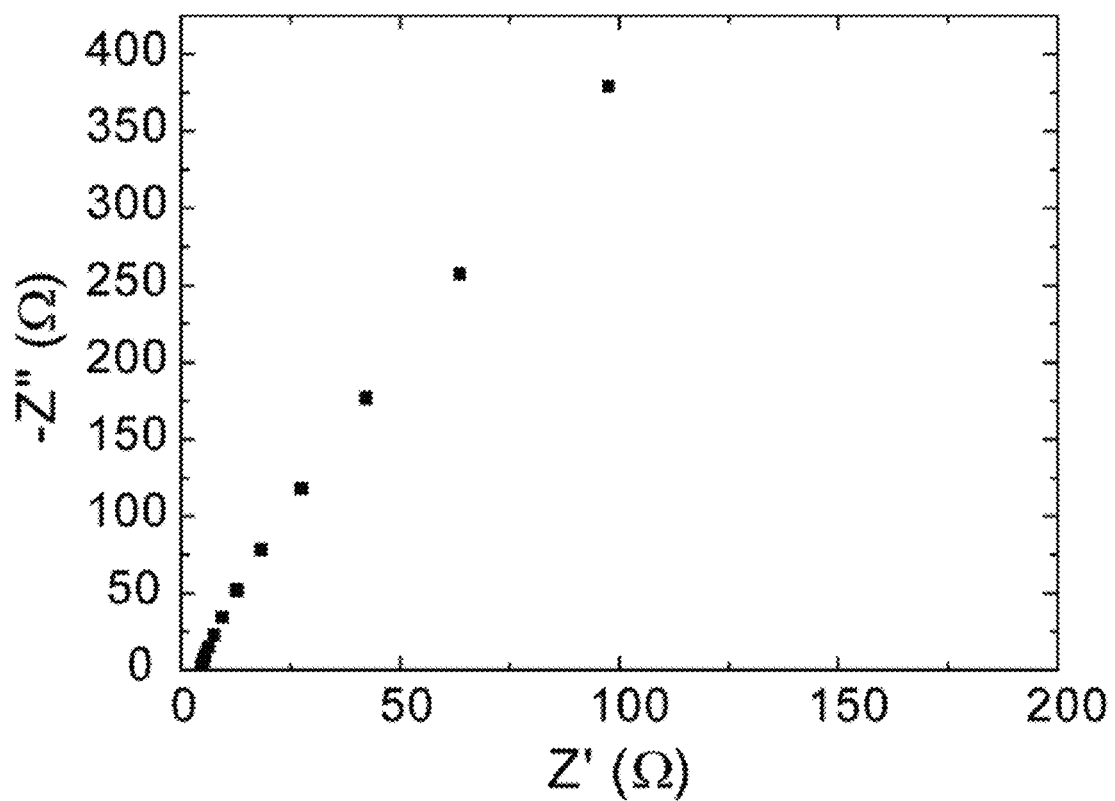
FIG. 11: Impedance of a polymer electrolyte (stainless steel/polymer electrolyte/stainless steel).

Impedance of the electrolyte is measured in a configuration of stainless steel (SS)/polymer electrolyte/SS (FIG. 11). The frequency range is 0.1-100 kHz. The intersect at the x axis is 4.6Ω, and the corresponding ionic conductivity is 2×10⁻³ S/cm.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A transparent electrochemical energy storage device comprising:
   a pair of electrodes; and
   an electrolyte disposed between the electrodes,
   wherein each of the electrodes includes
   a transparent substrate and
   a current collector and an electrode active material that are arranged across the transparent substrate in a pattern with a feature dimension no greater than 200 µm and occupying an areal fraction in the range of 5% to 70%.

2. The transparent electrochemical energy storage device of claim 1, wherein the feature dimension is no greater than 100 µm.

3. The transparent electrochemical energy storage device of claim 1, wherein the feature dimension is no greater than 50 µm.

4. The transparent electrochemical energy storage device of claim 1, wherein the current collector and the electrode active material are arranged in the pattern with a feature spacing of at least 10 µm.

5. The transparent electrochemical energy storage device of claim 4, wherein the feature spacing is at least 50 µm.

6. The transparent electrochemical energy storage device of claim 4, wherein the feature spacing is at least 200 µm.

7. The transparent electrochemical energy storage device of claim 1, wherein a remaining areal fraction of the transparent substrate is devoid of the current collector and the electrode active material.

8. The transparent electrochemical energy storage device of claim 1, wherein the areal fraction is in the range of 5% to 40%.

9. The transparent electrochemical energy storage device of claim 1, wherein the pattern corresponds to at least one of a grid pattern, a crisscross pattern, a honeycomb pattern, and a dot pattern.

10. The transparent electrochemical energy storage device of claim 1, wherein the transparent substrate includes an array of trenches, and the current collector and the electrode active material are disposed in the trenches.

11. The transparent electrochemical energy storage device of claim 1, wherein an overall transparency of the device is in the range of 20% to 90% for wavelengths in the range of 400 nm to 700 nm.

12. The transparent electrochemical energy storage device of claim 1, wherein an overall transparency of the device is in the range of 30% to 60% for wavelengths in the range of 400 nm to 700 nm.

13. The transparent electrochemical energy storage device of claim 1, wherein the respective patterns of the electrodes are aligned with each other.

14. A patterned electrode comprising:
   a substrate including an array of trenches; and
   a current collector and a set of electrode materials disposed in the trenches,
   wherein a thickness of the current collector and the set of electrode materials is no greater than a depth of the trenches, and
   a transparency of the patterned electrode is in the range of 30% to 90% for wavelengths in the range of 400 nm to 700 nm.

15. The patterned electrode of claim 14, wherein the set of electrode materials include a lithium-ion intercalation material.

16. The patterned electrode of claim 14, wherein the set of electrode materials include nano-sized structures of an intercalation material.

17. The patterned electrode of claim 14, wherein the thickness of the current collector and the set of electrode materials is in the range of 5 µm to 500 µm.

18. The patterned electrode of claim 14, wherein the substrate includes at least one of a plastic and a glass.

19. The patterned electrode of claim 14, wherein a width of the trenches is no greater than 150 µm.

20. The patterned electrode of claim 14, wherein the transparency of the patterned electrode is in the range of 50% to 90% for wavelengths in the range of 400 nm to 700 nm.

* * * * *